(12) United States Patent
Majmundar et al.

(10) Patent No.: US 11,375,432 B2
(45) Date of Patent: Jun. 28, 2022

(54) FLEXIBLE FRAMEWORK FOR MULTI-HOP ROUTING IN AN INTEGRATED ACCESS AND BACKHAUL NETWORK FOR 5G OR OTHER NEXT GENERATION NETWORK

(71) Applicant: AT&T Intellectual Property I, L.P., Atlanta, GA (US)

(72) Inventors: Milap Majmundar, Austin, TX (US); Thomas Novlan, Cedar Park, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 184 days.

(21) Appl. No.: 16/401,077

(22) Filed: May 1, 2019

(65) Prior Publication Data
US 2020/0351750 A1 Nov. 5, 2020

(51) Int. Cl.
*H04W 40/22* (2009.01)
*H04W 88/08* (2009.01)

(52) U.S. Cl.
CPC .......... *H04W 40/22* (2013.01); *H04W 88/085* (2013.01)

(58) Field of Classification Search
CPC .................................................. H04W 40/22
See application file for complete search history.

(56) References Cited

U.S. PATENT DOCUMENTS

2016/0366632 A1* 12/2016 Cui ........................ H04W 8/22
2020/0022054 A1*  1/2020 Hong ................... H04W 48/20
2021/0168646 A1*  6/2021 Chen .................... H04W 28/10

OTHER PUBLICATIONS

"Study on Integrated Access and Backhaul." 3rd Generation Partnership Project; Technical Specification Group Radio Access Network. Dec. 2018. 111 pages.
"Control plane signaling to support IAB routing." 3GPP TSG-RAN WG2 Meeting #105, Athens, Greece, Feb. 25-Mar. 1, 2019. 4 pages.

* cited by examiner

*Primary Examiner* — Sulaiman Nooristany
(74) *Attorney, Agent, or Firm* — Amin, Turocy & Watson, LLP

(57) ABSTRACT

In a 5G network, an integrated access and backhaul (IAB) network can experience radio link failures or radio blockage conditions in mmWave frequency bands. Local IAB nodes that experience such conditions can make route changes in response to such situations to prevent packet loss or significant packet delay. Thus, in an IAB network, local IAB nodes can also utilize a routing function that monitors local conditions of IAB links to determine whether a change in route is required or not. Additionally, the local IAB nodes can receive external routing updates that can preempt a local IAB node routing function. Consequently, the IAB node can consider local routing preferences and external routing preferences prior to updating a routing table of the IAB node.

20 Claims, 10 Drawing Sheets

:
FLEXIBLE FRAMEWORK FOR MULTI-HOP ROUTING IN AN INTEGRATED ACCESS AND BACKHAUL NETWORK FOR 5G OR OTHER NEXT GENERATION NETWORK

TECHNICAL FIELD

This disclosure relates generally to an integrated access and backhaul network architecture for a 5G new radio (NR) networks. For example, this disclosure relates to a flexible framework for multi-hop routing in an integrated access and backhaul network for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating a flexible framework for multi-hop routing in an integrated access and backhaul network is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
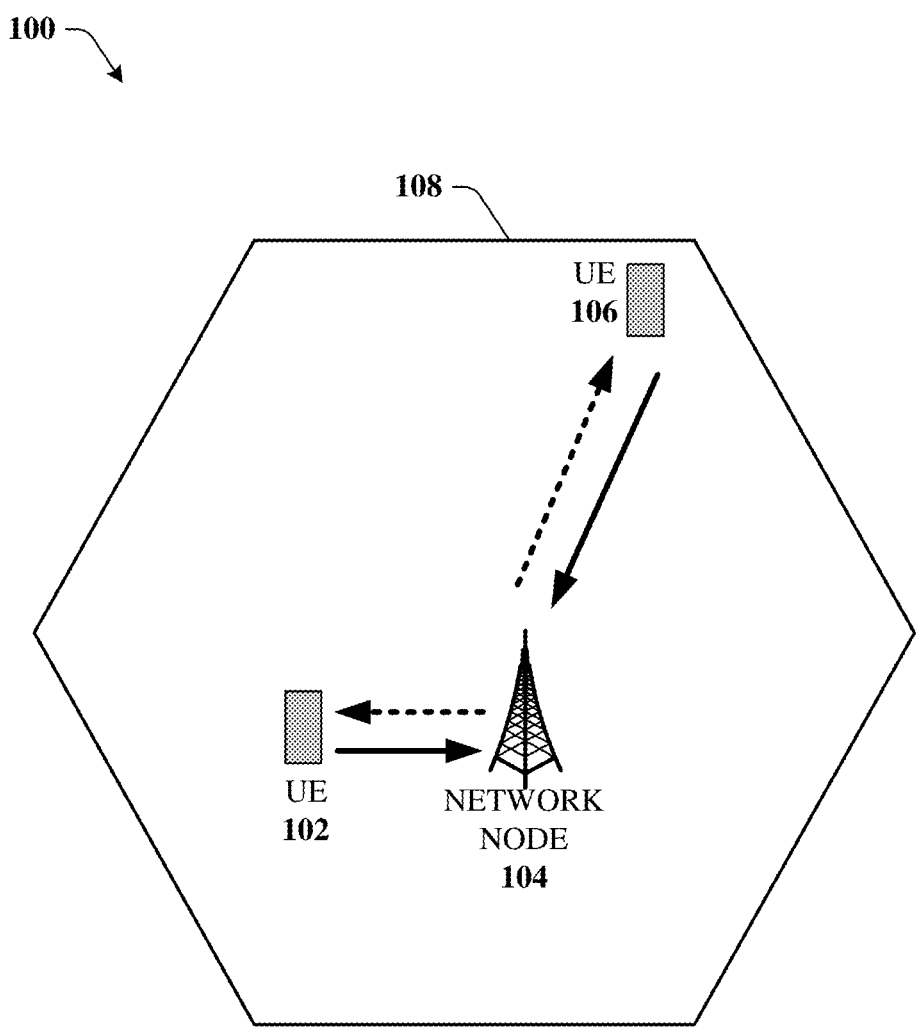
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate a flexible framework for multi-hop routing in an integrated access and backhaul network for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate a flexible framework for multi-hop routing in an integrated access and backhaul network for a 5G network. Facilitating a flexible framework for multi-hop routing in an integrated access and backhaul network for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Existing solutions that are designed for multi-hop mesh networks tend to be very distributed in nature, and do not consider, that the centralized donor node in an IAB network has an excellent overview of the multi-hop topology and radio conditions across that topology in near-real time. Hence, the multi-hop mesh-based routing algorithms are not able to take advantage of such inherent aspects of a hierarchical IAB network. Therefore, currently there is a void in terms of a flexible routing framework that allows the central routing function to determine the best routes while still allowing the local IAB nodes to take decisions based on local conditions.

IAB is a multi-hop network that is not mesh based. So there is a hierarchical quality that can utilize a central entity to make routing decisions more efficiently. However, the IAB nodes can make local decisions such that local IAB node failures are unknown to the central entity. Thus, the central entities lack of knowledge can facilitate the central entity to make non-efficient routing decisions. Each IAB can comprise a local routing function hosted by a local table of the IAB. A routing update selector function hosted at the IAB node can decide whether the routing table should be updated with data from the IABs local routing function and/or data from an external central entity. There can also be pre-emptive flag associated with the data provided by the central entity. For example, the data sent from the central entity to the IAB node's route update selector function can comprise flag data. The flag data can be representative of a priority and/or a cost metric to be given to the route, provided by the central entity, such that the IAB routing update selector function can select the route from the central entity, based on the priority and/or cost metric, over a route decision generated local to the IAB node.

This disclosure proposes a flexible framework for routing packets across a multi-hop IAB network. The adaptation layer at each IAB node of a multi-hop IAB network can perform routing of packets to the next hop IAB node. This routing can be performed based on a routing table that contains information related to the UE bearer, route ID, egress logical channel ID (LCID), quality of service (QoS) information (5QI), and/or a routing cost metric. It should be noted that multiple routes can be possible from one IAB node to another IAB node. Traditional IP-routers can have a forwarding information base (FIB), which is a lookup table of the next hop IP address corresponding to a destination IP address. The routing table in an IAB network can be analogous to such a FIB. The next hop IAB node for a given route destination IAB node can be indicated in the IAB routing table similar to how the next hop IP address is indicated for each destination IP address in a FIB. In a software defined network (SDN) based IP network, the FIB can be populated on each white-box router by the SDN controller via a southbound interface (e.g., using OpenFlow). In such cases, the routing updates to a white-box router can be pre-emptive based on the assumption that the central SDN controller always knows how to choose the best route.

In a similar manner, in an IAB network, a central routing function residing at the centralized donor node (CU-CP) can view the overall health of the multi-hop IAB network because it has a view of the network topology and conditions of the IAB links on the child nodes under it. It should also be noted that, as explained earlier, IAB is based on a hierarchical network, so unlike a wireless mesh network, the central IAB donor node can have the best view of the multi-hop network under its hierarchy. On the contrary, since IAB networks can experience radio link failures or radio blockage conditions (in mmWave frequency bands, and especially when IAB nodes are mobile), local IAB nodes that experience such conditions can be in a position to make route changes in response to such situations to prevent packet loss or significant packet delay. Hence, in an IAB network, local IAB nodes can also need to have a routing function that monitors local conditions of IAB links to determine whether a change in route is required or not. If an IAB Node waits for a central entity to react to a local failure condition, it can be too late to prevent packet loss or performance loss in the IAB network. Hence, there can be a need for both a central routing mechanism and a local routing function to co-exist in an IAB network without conflicting with each other.

In one embodiment, described herein is a method comprising generating, by a first wireless network device comprising a processor, first route data representative of a first route for packet data of a wireless network. The method can comprise receiving, by the first wireless network device from a second wireless network device, second route data representative of a second route for the packet data of the wireless network. Additionally, in response to the receiving the second route data, the method can comprise selecting, by the first wireless network device, a route from the first route data or the second route data, resulting in selected route data.

According to another embodiment, a system can facilitate, receiving first route data representative of a first route for packet data of a wireless network. The system can facilitate receiving second route data representative of a second route for the packet data of the wireless network. In response to the receiving the second route data, the system can facilitate selecting the second route as a selected route. Additionally, based on the selecting the second route, the system can facilitate generating a data structure to be associated with selected route data representative of the selected route.

According to yet another embodiment, described herein is a machine-readable storage medium that can perform the operations comprising generating first route data representative of a first route for packet data of a wireless network. The machine-readable storage medium can perform the operations comprising receiving second route data representative of a second route, different than the first route, for the packet data of the wireless network. Additionally, based on a priority cost metric value associated with the second route data, machine-readable storage medium can perform the operations comprising selecting the second route, resulting in a selected route. Furthermore, based on the selecting the second route, the machine-readable storage medium can perform the operations comprising generating a data structure to be associated with selected route data representative of the second route as the selected route.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g., LTE FDD/TDD, GSM/GERAN, CDMA2000, etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network node 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication demands of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
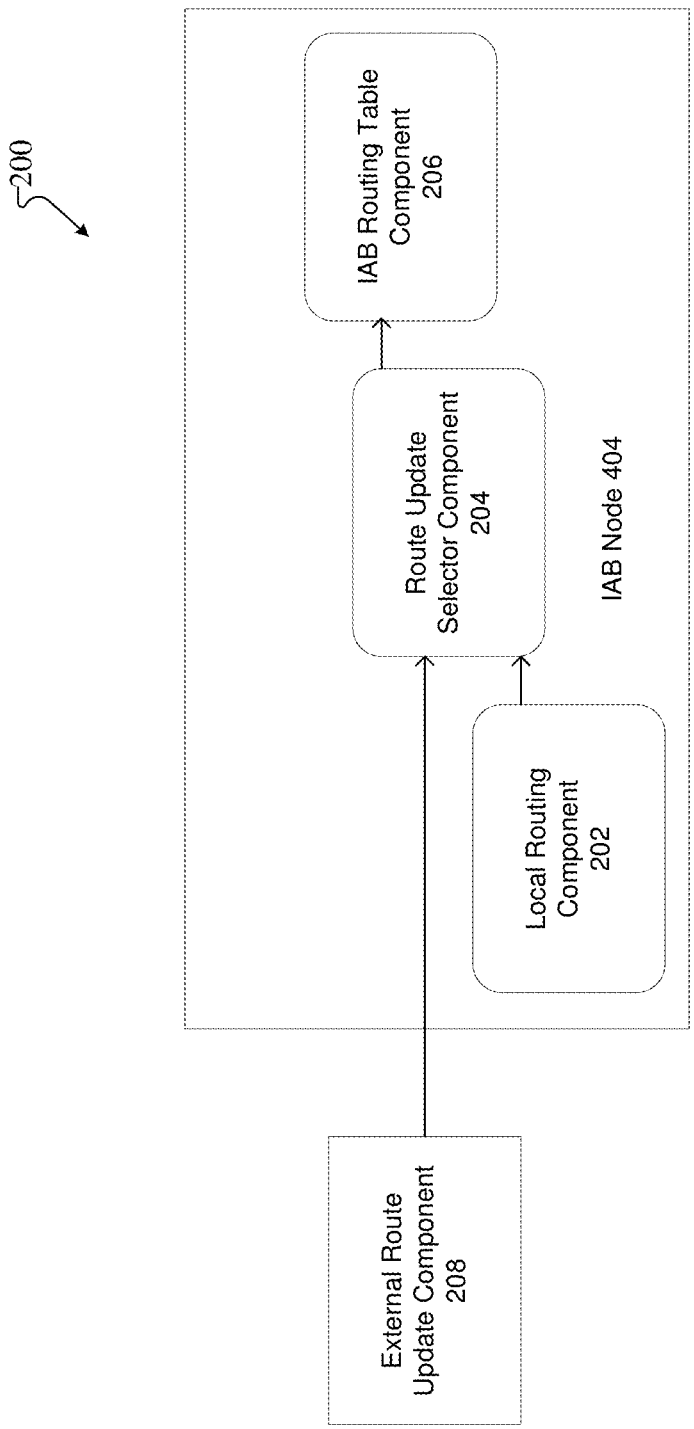
FIG. 2 illustrates an example schematic system block diagram of routing function co-existence according to one or more embodiments.

Referring now to FIG. 2, illustrated is an example schematic system block diagram of routing function co-existence according to one or more embodiments.

As depicted in FIG. 2, the structural framework 200 can allow local and central routing functions to co-exist in an IAB node 404. A local route update selector component 204 can be designed to select between route updates provided by a local routing component 202 at the IAB node 404 versus route updates provided by an external route update component 208 residing, for example, at the CU-CP. The route update selector component 204 can populate the actual IAB routing table component 206 at the IAB node 404 based on its decision. The route update from the external route update component 208 residing, for example, at the CU-CP can be provided to the IAB node 404 in the form of control plane signaling, such as a radio resource control (RRC) message. This disclosure presents the overall framework shown in FIG. 2 to allow the IAB node 404 to select between the route updates provided by the external route update component 208 vs. the local routing component 202.

However, it is possible that there are conflicts between the routing decision made by the local routing component 202 vs. the external route update component 208. In such a case, a mechanism (e.g., pre-emption) can allows the two separate routing functions to co-exist without conflicting with each other. The routing update message sent from the CU-CP to the IAB node 404 can comprise a field to indicate pre-emption. When a pre-emption flag is set in the route update message, the route update selector component 204 can select the route update message provided by the external route update component 208 to pre-empt the route by the local routing component 202. In this case, any decisions made by the local routing component 202 can be ignored by the route update selector component 204. As discussed previously, the external route update component 208 can make routing decisions based on its view of the overall condition of the IAB network, including the routing paths and link conditions in its hierarchy. The pre-emption functionality can allow the external route update component 208 to take over complete control of all routing decisions in the IAB network when conditions demand it. Under normal conditions, the external route update component 208 can provide route updates without the pre-emption flag set. In this case, the local routing component 202 can have the freedom to make local routing decisions, such as choosing an alternative redundant path (e.g., a copy) in case of a local link failure, etc. Hence, the presented framework can allow both the central and local routing components to co-exist while giving the external route update component 208 the ability to take full control of routing decisions. It should also be noted that bi-direction communication can occur between the components of FIG. 2.

Figure 3:
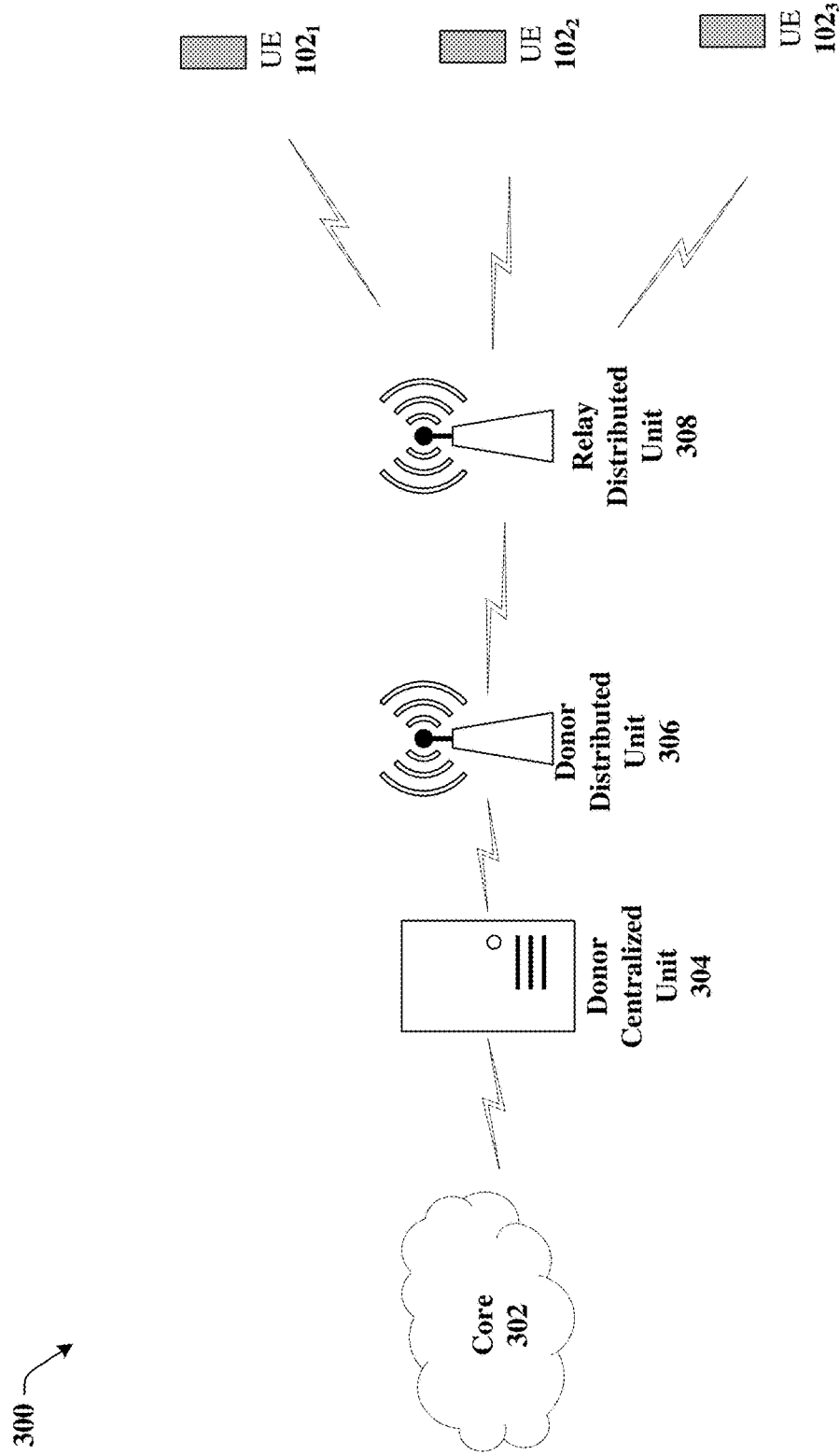
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. An IAB feature can enable future cellular network deployment scenarios and applications to the support wireless backhaul and relay links enabling flexible and very dense deployment of NR cells without the need for densifying the transport network proportionately. It should be noted that although some of the communication is depicted as wireless in FIG. 3, it is also possible for the network 300 to utilize one or more wired lines (fiber) to facilitate this disclosure.

Due to the expected larger bandwidth available for NR compared to LTE (e.g., mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g., beam-based operation). Thus, FIG. 3 illustrates a generic IAB set-up comprising a core network 302, a centralized unit 304, donor distributed unit 306, relay distributed unit 308, and UEs 1021, 1022, 1023. The donor distributed unit 306 (e.g., access point) can have a wired backhaul with a protocol stack and can relay the user traffic for the UEs 1021, 1022, 1023 across the IAB and backhaul link. Then the relay distributed unit 308 can take the backhaul link and convert it into different strains for the connected UEs 1021, 1022, 1023. Although FIG. 3 depicts a single hop (e.g., over the air), it should be noted that multiple backhaul hops can occur in other embodiments.

Figure 4:
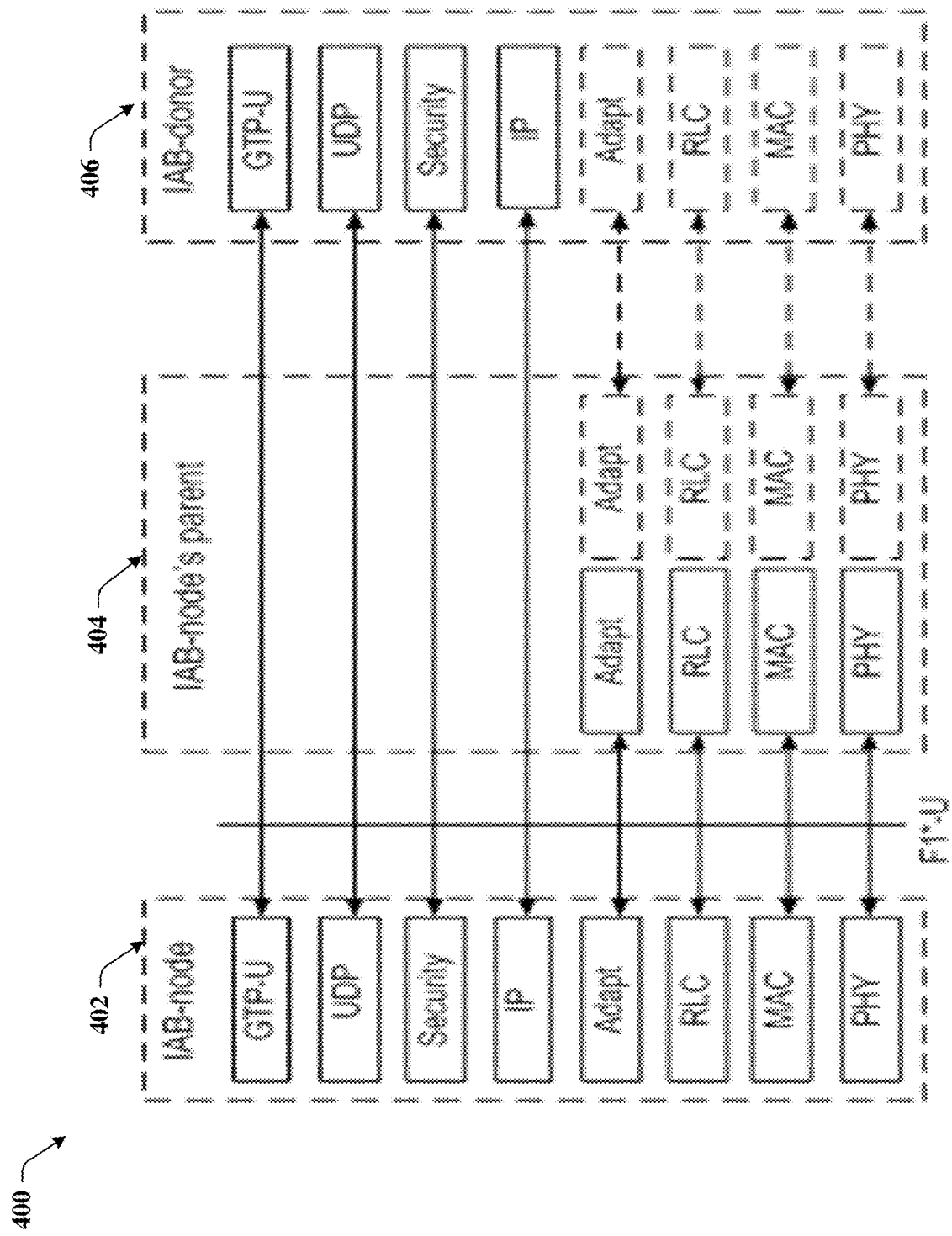
FIG. 4 illustrates an example user-plane protocol design according to one or more embodiments.

Referring now to FIG. 4, illustrated is an example user-plane protocol stack 400 according to one or more embodiments. FIG. 4 depicts a new protocol stack layer, currently called an adaptation layer. With regards to FIGS. 4 and 5, it should be noted that the IAB node 404 can be a parent IAB node 404 and the IAB node 402 can be a child IAB node 402. However, this relationship is not necessary to facilitate the utilization of the disclosed process. The adaptation layer at each IAB node 402, 404 can perform routing of packets across the IAB backhaul network. It can also perform a many-to-one mapping of UE bearers into a radio link control (RLC) channel across an IAB hop. Thus, an exchange of a quality metric can occur between a child IAB node (e.g., child IAB node 402) and a parent IAB node (e.g., parent IAB node 404) at the adaptation layer (e.g., adapt) to improve routing and/or scheduling of user data packets across the IAB network.

The adaptation (e.g., adapt) layer can either be above the RLC layer or below the RLC layer in various alternatives. For alternatives that place the adapt layer below the RLC, data from multiple UE bearers can be aggregated into one or more backhaul channels. For alternatives that place the adapt layer above the RLC the aggregation of data from multiple UE bearers into one or more backhaul channels can be performed at the adapt layer above the RLC. In the case of alternatives that place the adapt layer above the RLC, the routing functionality can be a part of the adapt layer. In the case where the adapt layer is below the RLC, there can be a routing sublayer at the top of the protocol stack at each IAB node As depicted in FIG. 4, the protocol stack from the mobile termination (MT) of a serving child IAB node 402 to the distributed unit (DU) of the donor IAB node 406 can comprise a general packet radio services tunneling protocol (GTP-U) layer, a user datagram protocol (UDP) layer, a security layer, an internet protocol (IP) layer, an adaption (adapt) layer, a radio link control (RLC) layer, a media access control (MAC) layer, and a physical (PHY) layer. The adapt layer can perform a routing function from one JAB node (e.g., child JAB node 402) to a parent JAB node 404, via the adapt layer, while also communicating via the RLC, MAC, and/or PHY layers. The parent JAB node 404 can then communicate this data to the donor JAB node 406.

Figure 5:
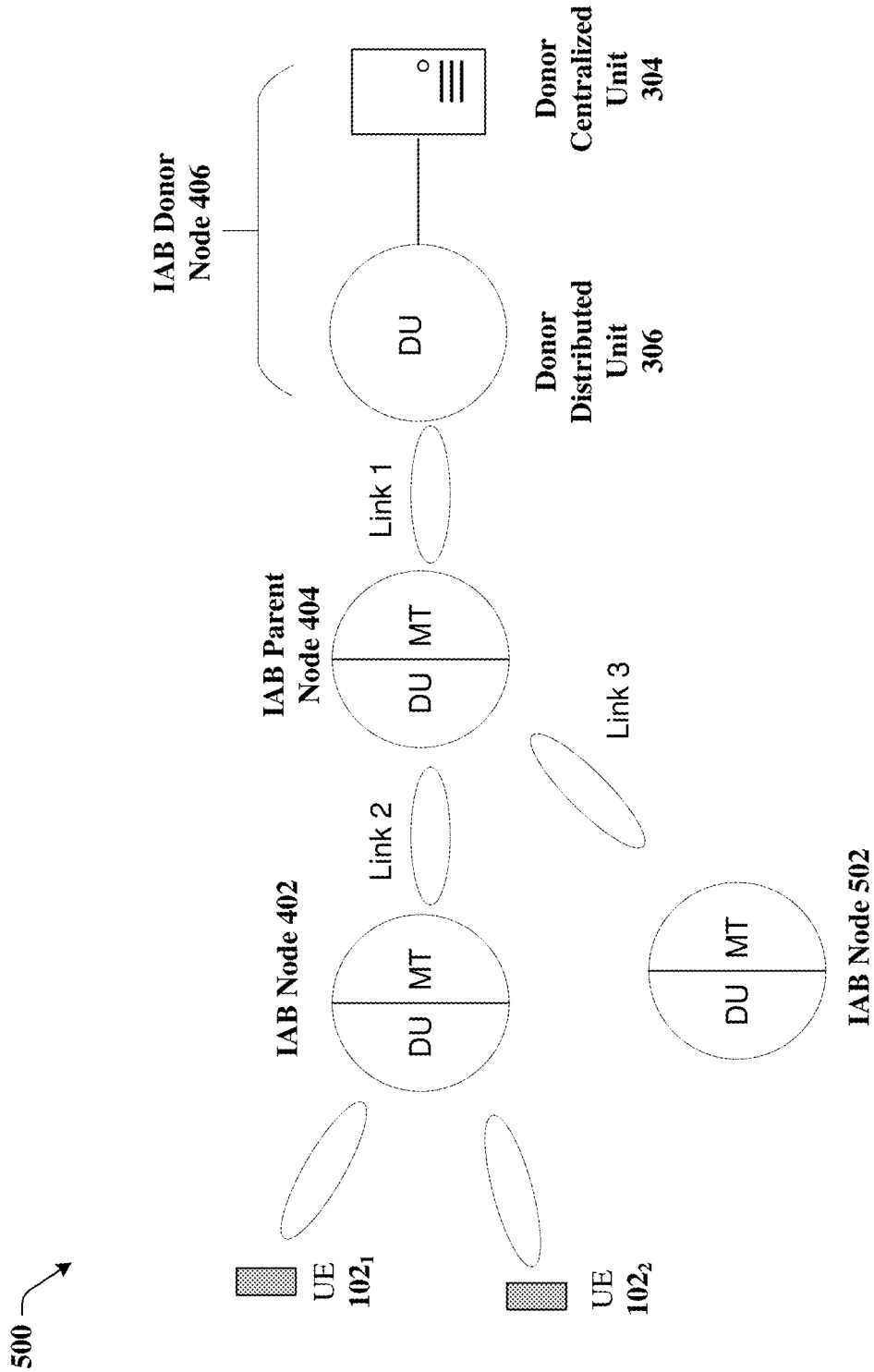
FIG. 5 illustrates an example schematic system block diagram of an integrated access and backhaul network according to one or more embodiments.

Referring now to FIG. 5, illustrated is an example schematic system block diagram of an integrated access and backhaul network according to one or more embodiments. This disclosure proposes a flexible framework for routing packets across a multi-hop IAB network. As depicted in FIG. 5, the child IAB nodes 402, 502 can send a quality metric via link 2 and link 3, respectively, to its parent IAB node 404, to indicate to the parent IAB node 404 information related to the quality of further down from the child IAB nodes 402, 502. For example, this information can comprise information associated with the UE bearer of the UE 102 and/or radio quality experienced by packets being transmitted between the UE bearer and the child IAB node 402. It should be noted that the parent IAB node 404 (or other IAB nodes in other scenarios) can receive external routing data (with or without pre-emption) from the external route update component 208 of a central routing function at the CU-CP of the donor IAB node 406. The local routing component 202 can send data generated by the parent IAB node 404 to the route update selector component 204 of the parent IAB node 404. The route update selector component 204 then has the opportunity to select which route is better for data packets utilizing the route provided by the external route update component 208 or the route provided by the local routing component 202. Alternatively, if there is a pre-emption flag associated with the route provided by the external route update component 208, then the route update selector component 204 can select that route as opposed to the route from the local routing component 202. Thus, the external route is given priority. After the route update selector component 204 has selected the appropriate route, it can forward this data to the IAB routing table component 206.

Figure 6:
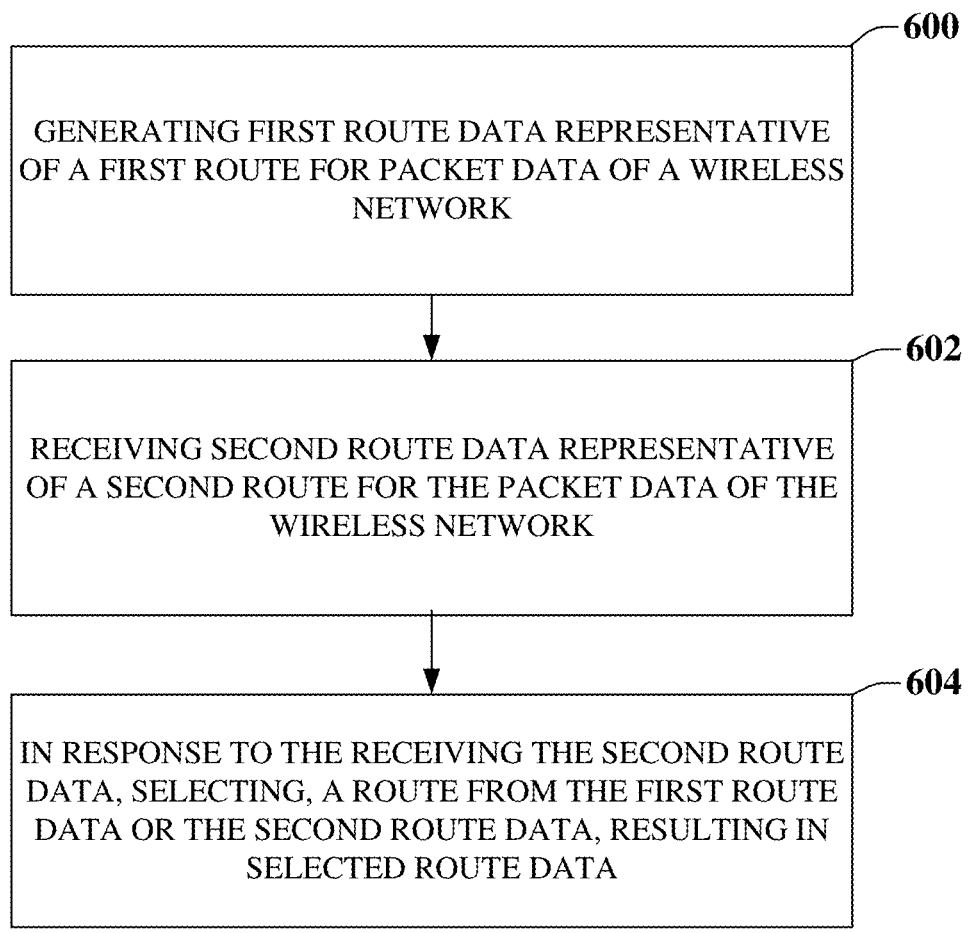
FIG. 6 illustrates an example flow diagram of a method that facilitates a flexible framework for multi-hop routing in an integrated access and backhaul network according to one or more embodiments.

Referring now to FIG. 6, illustrated is an example flow diagram of a method that facilitates a flexible framework for multi-hop routing in an integrated access and backhaul network according to one or more embodiments. At element 600, the method can comprise generating (e.g., via the local routing component 202) first route data representative of a first route for packet data of a wireless network. At element 602, the method can comprise receiving, from a second wireless network device (e.g., external route update component 208), second route data representative of a second route for the packet data of the wireless network. Additionally, in response to the receiving the second route data, at element 604, the method can comprise selecting (e.g., via the route update selector component 204) a route from the first route data or the second route data, resulting in selected route data.

Figure 7:
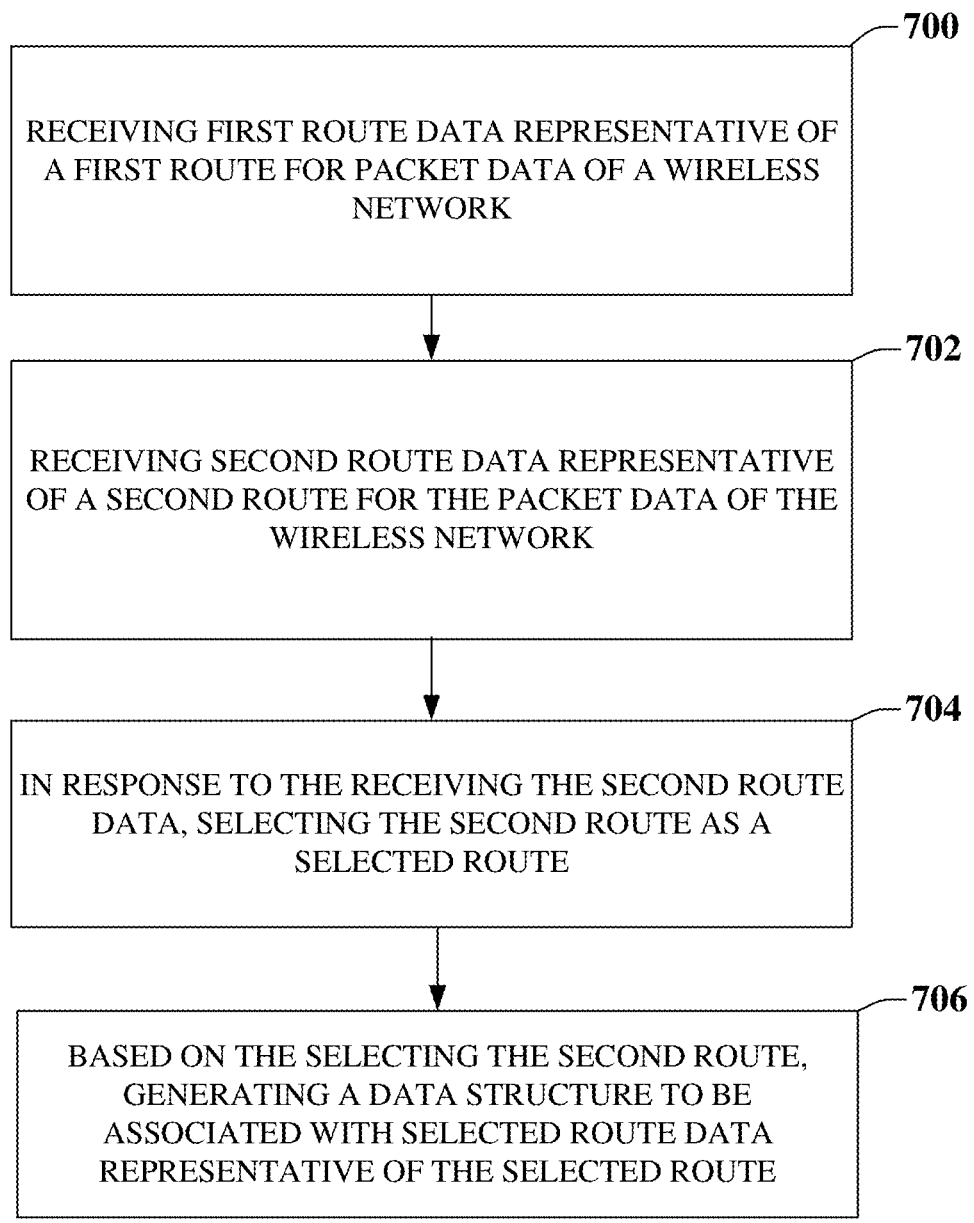
FIG. 7 illustrates an example flow diagram of a system that facilitates a flexible framework for multi-hop routing in an integrated access and backhaul network according to one or more embodiments.

Referring now to FIG. 7, illustrated is an example flow diagram of a system that facilitates a flexible framework for multi-hop routing in an integrated access and backhaul network according to one or more embodiments. At element 700, a system can facilitate, receiving (e.g., via the local routing component 202) first route data representative of a first route for packet data of a wireless network. At element 702, the system can facilitate receiving second route data (e.g., from external route update component 208) representative of a second route for the packet data of the wireless network. In response to the receiving the second route data, at element 704, the system can facilitate selecting (e.g., via the route update selector component 204) the second route as a selected route. Additionally, based on the selecting the second route, at element 706, the system can facilitate generating a data structure (e.g., via the IAB routing table component 206) to be associated with selected route data representative of the selected route.

Figure 8:
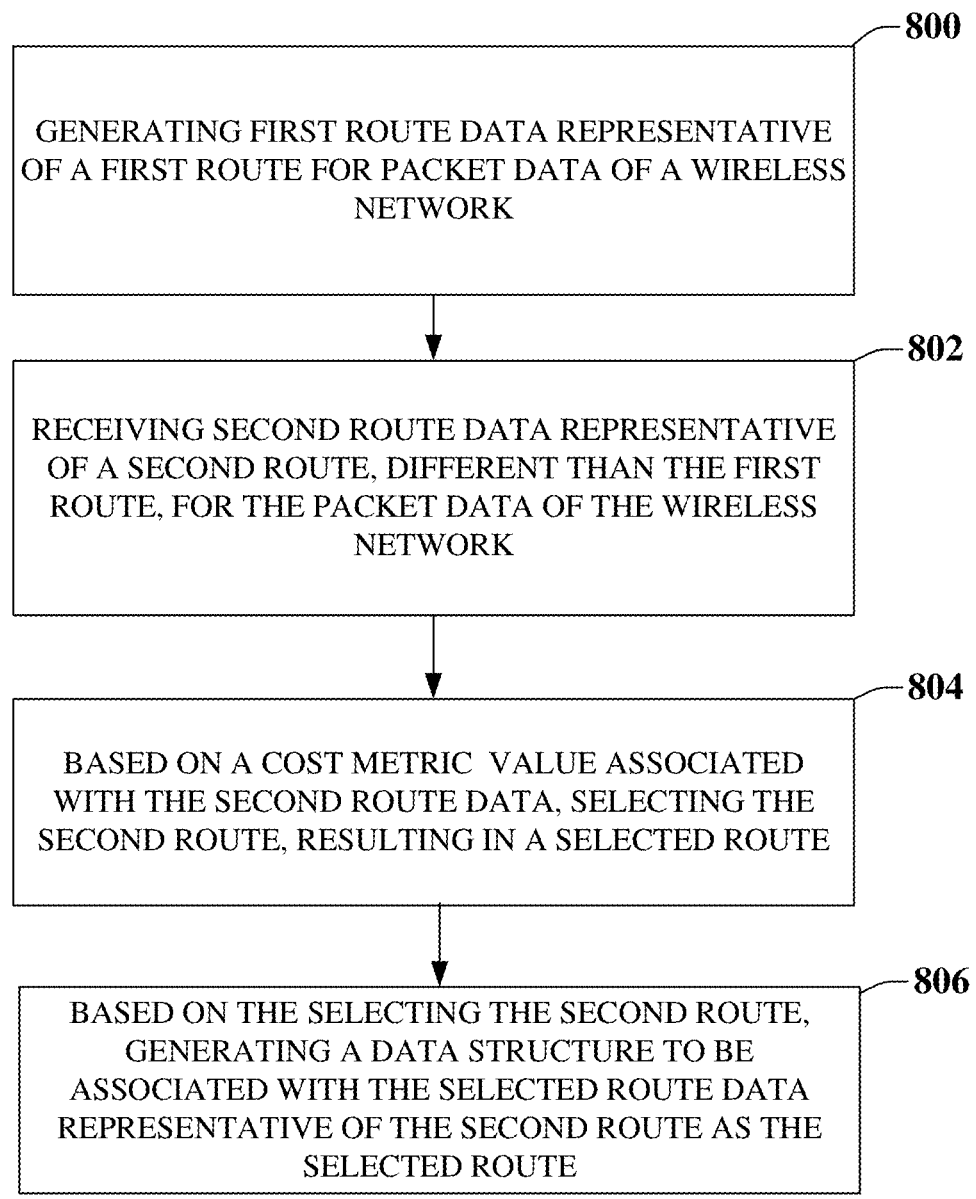
FIG. 8 illustrates an example flow diagram of a machine-readable medium that facilitates a flexible framework for multi-hop routing in an integrated access backhaul network according to one or more embodiments.

Referring now to FIG. 8, illustrated is an example flow diagram of a machine-readable medium that facilitates a flexible framework for multi-hop routing in an integrated access and backhaul network according to one or more embodiments. At element 800, a machine-readable storage medium can perform the operations comprising generating first route data (e.g., via the local routing component 202) representative of a first route for packet data of a wireless network. At element 802, the machine-readable storage medium can perform the operations comprising receiving (e.g., from external route update component 208) second route data representative of a second route, different than the first route, for the packet data of the wireless network. Additionally, based on a cost metric value associated with the second route data, at element 804, the machine-readable storage medium can perform the operations comprising selecting (e.g., via the route update selector component 204) the second route, resulting in a selected route. Furthermore, based on the selecting the second route (e.g., via the route update selector component 204), at element 806, the machine-readable storage medium can perform the operations comprising generating a data structure (e.g., via the IAB routing table component 206) to be associated with selected route data representative of the second route as the selected route.

Figure 9:
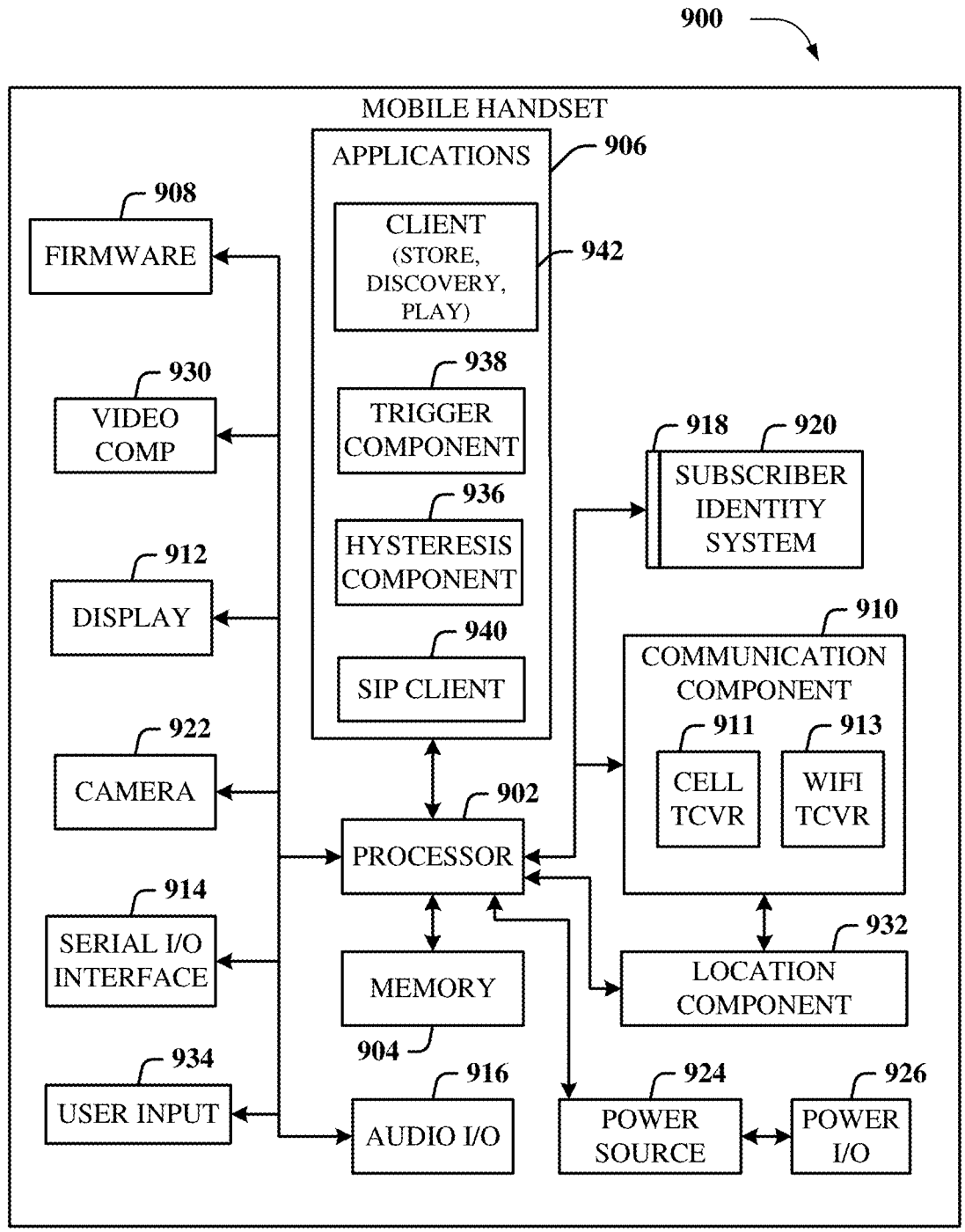
FIG. 9 illustrates an example block diagram of an example mobile handset operable to engage in a system architecture that facilitates secure wireless communication according to one or more embodiments described herein.

Referring now to FIG. 9, illustrated is an example block diagram of an example mobile handset 900 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This can support updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touchscreen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
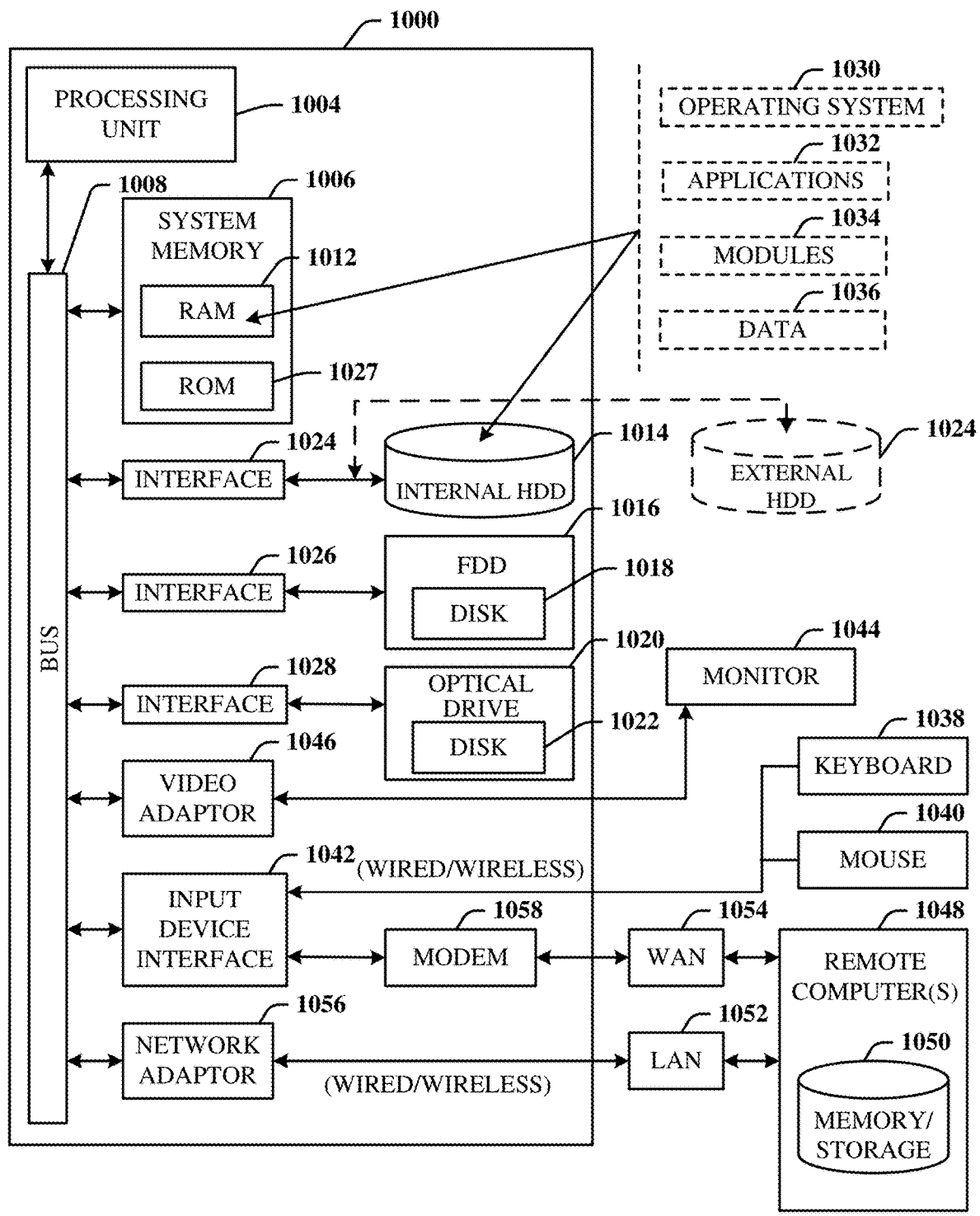
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server (e.g., Microsoft server) and/or communication device. In order to provide additional context for various aspects thereof, FIG. 10 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the innovation can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) can include a microphone, an IR remote control, a joystick, a game pad, a stylus pen, touchscreen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1000 is connected to the local network 1052 through a wired and/or wireless communication network interface or adapter 1056. The adapter 1056 can facilitate wired or wireless communication to the LAN 1052, which can also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 7 Mbps (802.11a) or 54 Mbps (802.11b) data rate, for example, or with products that contain both bands (dual band), so the networks can provide real-world performance similar to the basic 16BaseT wired Ethernet networks used in many offices.

An aspect of 5G, which differentiates from previous 4G systems, is the use of NR. NR architecture can be designed to support multiple deployment cases for independent configuration of resources used for RACH procedures. Since the NR can provide additional services than those provided by LTE, efficiencies can be generated by leveraging the pros and cons of LTE and NR to facilitate the interplay between LTE and NR, as discussed herein.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "Node B (NB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity,"

"consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

The various aspects described herein can relate to New Radio (NR), which can be deployed as a standalone radio access technology or as a non-standalone radio access technology assisted by another radio access technology, such as Long Term Evolution (LTE), for example. It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G, or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification procedures and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable media can comprise, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
generating, by a sub-node device of a hierarchical network, the sub-node device comprising a processor, first route data representative of a first route for packet data of the hierarchical network;
receiving, by the sub-node device from a centralized donor-node device of the hierarchical network via a control plane signal comprising radio resource control message data representing a routing update message indicating whether to preempt the first route data, second route data representative of a second route for the packet data of the hierarchical network, wherein the centralized donor-node device monitors operating conditions corresponding to the sub-node device, and wherein the second route data comprises flag data representative of a routing cost metric of the second route to assist in route selection;
in response to receiving the second route data, and in response to receiving, from the centralized donor-node device, the routing update message indicating whether to preempt the first route data, selecting, by the sub-node device, a route from the first route data or the second route data, resulting in selected route data representative of a selected route, wherein selecting the route further comprises, in response to the routing update message being determined to indicate that the first route is to be preempted, selecting, by the sub-node device, the second route as the selected route; and in response to the selected route having been selected, generating, by the sub-node device, a data structure to be associated with the selected route data representative of the selected route, wherein the data structure comprises routing cost metric data representative of the routing cost metric and logical channel identification data representative of an egress logical channel associated with the selected route.

2. The method of claim 1, further comprising:

in response to generating the data structure, populating, by the sub-node device, the data structure with the selected route data.

3. The method of claim 2, wherein network equipment comprises the centralized donor-node device.

4. A system, comprising:

a processor; and a memory that stores executable instructions that, when executed by the processor, facilitate performance of operations, comprising:

generating, via a sub-node network equipment of a hierarchical network, first route data representative of a first route for packet data via the hierarchical network;

receiving, via the sub-node network equipment from a centralized donor-node equipment of the hierarchical network via a control plane signal comprising radio resource control message data representing a routing update message indicating whether the first route is to be preempted by a second route for the packet data via the hierarchical network, second route data representative of the second route, wherein the centralized donor-node network equipment monitors operating conditions of the sub-node network equipment, and wherein the second route data comprises flag data representative of a routing cost metric associated with the second route;

in response to receiving the second route data, and in response to receiving, from the centralized donor-node network equipment, the routing update message indicating that the first route is to be preempted by the second route, selecting, via the sub-node network equipment, the second route data, resulting in selected route data; and in response to selecting the second route data, generating, via the sub-node network equipment, a data structure to be associated with the selected route data, wherein the data structure comprises routing cost metric data representative of the routing cost metric and logical channel identification data representative of an egress logical channel associated with the second route data.

5. The system of claim 4, wherein the operations further comprise:

in response to receiving the second route data, selecting, via the sub-node network equipment, the second route as a selected route for the packet data via the hierarchical network.

6. The system of claim 4, wherein the operations further comprise:

routing, via the sub-node network equipment, the packet data via the hierarchical network in accordance with the selected route data.

7. The system of claim 4, wherein the first route is generated in accordance with a local routing function of the sub-node network equipment.

8. The system of claim 4, wherein the second route is generated in accordance with a central routing function of the centralized donor-node equipment.

9. The system of claim 4, wherein the operations further comprise:

in response to a link failure between the sub-node network equipment of the hierarchical network and the centralized donor-node network equipment of the hierarchical network, generating redundant routing data that comprises the second route data.

10. The system of claim 4, wherein the operations further comprise:

in response to a link failure between the sub-node network equipment of the hierarchical network and the centralized donor-node network equipment of the hierarchical network, selecting redundant routing data that comprises the first route data.

11. A non-transitory machine-readable medium, comprising executable instructions that, when executed by a processor, facilitate performance of operations, comprising:

generating, by a sub-node network equipment, first route data representative of a first route for packet data associated with a network;

receiving, by the sub-node network equipment from centralized donor-node network equipment via a control plane signal comprising radio resource control message data representing a routing update message indicating whether to preempt the first route data, second route data representative of a second route for the packet data associated with the network, wherein the second route data comprises flag data representative of a cost metric of the second route to assist in route selection;

in response to receiving the second route data, and in response to receiving the routing update message from the centralized donor-node network equipment indicating whether to preempt the first route data, selecting, by the sub-node network equipment, a route from a group of routes, the group of routes comprising the first route data and the second route data, resulting in selected route data, wherein selecting the route from the group of routes comprises selecting the route based on the cost metric, and wherein selecting the route further comprises in response to determining that the routing update message indicates that the first route is to be preempted, selecting the second route; and in response to selecting the route, generating, by the sub-node network equipment, a data structure to be associated with the selected route data representative of the route as being selected, wherein the data structure comprises cost metric data representative of the cost metric and logical channel identification data representative of an egress logical channel associated with the selected route data.

12. The non-transitory machine-readable medium of claim 11, wherein the operations further comprise:

in response to generating the data structure, populating, by the sub-node network equipment, the data structure with the selected route data.

13. The non-transitory machine-readable medium of claim 11, wherein the operations further comprise:

routing, by the sub-node network equipment, the packet data in accordance with the selected route data.

14. The non-transitory machine-readable medium of claim 11, wherein a cost metric value is associated with pre-emption data representative of a weight to be given to the second route data.

15. The non-transitory machine-readable medium of claim 11, wherein the operations further comprise:
in response to receiving the second route data, determining, by the sub-node network equipment, a conflict between the second route data and the first route data.

16. The non-transitory machine-readable medium of claim 11, wherein the operations further comprise:
in response to a network link failure, generating redundant data representative of a copy of the first route data or the second route data.

17. The method of claim 1, wherein the first route is generated in accordance with a local routing function of the sub-node device.

18. The method of claim 1, wherein the second route is generated in accordance with a central routing function of the centralized donor-node device.

19. The method of claim 1, further comprising:
in response to a link failure between the sub-node device of the hierarchical network and the centralized donor-node device of the hierarchical network, generating redundant routing data that comprises the second route data.

20. The method of claim 1, further comprising:
in response to a link failure between the sub-node device of the hierarchical network and the centralized donor-node device of the hierarchical network, selecting redundant routing data that comprises the first route data.

* * * * *